(12) United States Patent
Hu et al.

(10) Patent No.: US 9,527,947 B2
(45) Date of Patent: Dec. 27, 2016

(54) SEMI-CRYSTALLINE SHAPE MEMORY POLYMER AND PRODUCTION METHOD THEREOF

(71) Applicant: The Hong Kong Polytechnic University, Hung Hom (HK)

(72) Inventors: Jinlian Hu, Kowloon (HK); Yong Zhu, Kowloon (HK); Jianping Han, Kowloon (HK); Jing Lu, Kowloon (HK)

(73) Assignee: The Hong Kong Polytechnic University, Hung Hom (HK)

( * ) Notice: Subject to any disclaimer, the term of this patent is extended or adjusted under 35 U.S.C. 154(b) by 307 days.

(21) Appl. No.: 13/913,524

(22) Filed: Jun. 10, 2013

(65) Prior Publication Data
US 2014/0107312 A1  Apr. 17, 2014

Related U.S. Application Data
(60) Provisional application No. 61/712,787, filed on Oct. 11, 2012.

(51) Int. Cl.
| | |
|---|---|
| *C08G 18/32* | (2006.01) |
| *C08G 18/66* | (2006.01) |
| *C08G 18/42* | (2006.01) |
| *C08G 18/76* | (2006.01) |
| *C08G 18/24* | (2006.01) |
| *C08G 18/10* | (2006.01) |
| *C08G 18/73* | (2006.01) |

(52) U.S. Cl.
CPC .......... *C08G 18/3206* (2013.01); *C08G 18/10* (2013.01); *C08G 18/244* (2013.01); *C08G 18/324* (2013.01); *C08G 18/3228* (2013.01); *C08G 18/3231* (2013.01); *C08G 18/3234* (2013.01); *C08G 18/3243* (2013.01); *C08G 18/4238* (2013.01); *C08G 18/4277* (2013.01); *C08G 18/6618* (2013.01); *C08G 18/6651* (2013.01); *C08G 18/73* (2013.01); *C08G 18/76* (2013.01); *C08G 18/7671* (2013.01); *C08G 2280/00* (2013.01)

(58) Field of Classification Search
CPC ... C08G 18/10; C08G 18/244; C08G 18/3206; C08G 18/3228; C08G 18/3231; C08G 18/3234; C08G 18/324; C08G 18/3243; C08G 18/4238; C08G 18/4277; C08G 18/6618; C08G 18/6651; C08G 18/73; C08G 18/76; C08G 18/7671; C08G 2280/00
See application file for complete search history.

(56) References Cited

U.S. PATENT DOCUMENTS

| | | |
|---|---|---|
| 5,049,591 A | 9/1991 | Hayashi et al. |
| 5,098,776 A | 3/1992 | Hayashi et al. |
| 5,128,197 A | 7/1992 | Hayashi et al. |
| 5,135,786 A | 8/1992 | Hayashi et al. |
| 5,139,832 A | 8/1992 | Hayashi et al. |
| 5,145,935 A | 9/1992 | Hayashi |
| 5,155,199 A | 10/1992 | Hayashi |
| 6,160,084 A | 12/2000 | Grablowitz et al. |
| 6,388,043 B1 | 5/2002 | Langer et al. |
| 6,583,194 B2 | 6/2003 | Sendijarevic |
| 6,720,402 B2 | 4/2004 | Langer et al. |
| 6,759,481 B2 | 7/2004 | Tong |
| 6,858,680 B2 | 2/2005 | Gunatillake et al. |
| 7,628,116 B2 | 12/2009 | Browne et al. |
| 7,744,604 B2 | 6/2010 | Bearinger et al. |
| 7,795,350 B2 | 9/2010 | Campo et al. |
| 7,935,131 B2 | 5/2011 | Anthamatten et al. |
| 8,101,689 B2 | 1/2012 | Barnell et al. |
| 8,163,376 B2 | 4/2012 | Hayashi et al. |
| 8,172,873 B2 | 5/2012 | Anthamatten et al. |
| 8,198,369 B2 | 6/2012 | Xie |
| 2002/0161114 A1* | 10/2002 | Gunatillake ............ A61L 27/18 525/100 |
| 2003/0055198 A1 | 3/2003 | Langer et al. |
| 2004/0030062 A1 | 2/2004 | Liu et al. |
| 2005/0107563 A1* | 5/2005 | Hu ..................... C08G 18/0823 528/44 |
| 2006/0036045 A1 | 2/2006 | Bearinger et al. |
| 2008/0021166 A1 | 1/2008 | Snyder et al. |
| 2008/0262188 A1 | 10/2008 | Xie et al. |
| 2009/0309258 A1 | 12/2009 | Lendlein |
| 2010/0144962 A1 | 6/2010 | Jana et al. |
| 2011/0039967 A1 | 2/2011 | Bearinger et al. |
| 2011/0092652 A1 | 4/2011 | Voit et al. |
| 2011/0156310 A1 | 6/2011 | Lewandowski et al. |
| 2011/0178247 A1 | 7/2011 | Bartlett et al. |
| 2011/0275726 A1 | 11/2011 | Wilson et al. |

\* cited by examiner

*Primary Examiner* — Rabon Sergent
(74) *Attorney, Agent, or Firm* — Eagle IP Limited; Jacqueline C. Lui (57) ABSTRACT

A semi-crystalline shape memory polymer with transition temperature near body temperature and the production method thereof is disclosed. The shape memory polymer comprises a polymer chain which further comprises a plurality of prepolymers and a plurality of chain extenders bonding the prepolymers together in which each prepolymer further comprises a plurality of synthesized units. The above mentioned synthesized unit is obtained by reacting polymer diol with first diisocyanate. The obtained synthesized units are polymerized together with second diisocyanate and chain extender to form the shape memory polymer.

17 Claims, 5 Drawing Sheets

SEMI-CRYSTALLINE SHAPE MEMORY POLYMER AND PRODUCTION METHOD THEREOF

CROSS-REFERENCE TO RELATED APPLICATION

This application claims benefit under 35 U.S.C. §119(e) of U.S. Provisional Application having application No. 61/712,787 filed 11 Oct. 2012, which is hereby incorporated by reference herein in its entirety.

FIELD OF INVENTION

This invention relates to a shape memory polymer; in particular a semi-crystalline shape memory polymer and the method of production thereof.

BACKGROUND OF INVENTION

Thermally induced shape memory polymer can fix a temporary deformed shape and stay in that shape stably when the temperature is below its transition temperature. On the other hand, the polymer will return to its original shape when the temperature rises higher than the transition temperature. In the molecular level, thermally induced shape memory polymer should have a reversible switch and the netpoints. There are two types of reversible switch, namely amorphous segment and semi-crystalline segment. The transition temperature of the corresponding amorphous polymer and semi-crystalline polymer are glass transition temperature and melting temperature respectively. The netpoints can be physical ones such as hard segment reinforcement, molecular entanglement in linear structural polymer or chemical ones in covalently cross-linked polymer. A great number of amorphous and semi-crystalline shape memory polymers can be designed, for example in U.S. Pat. No. 6,160,084, U.S. Pat. No. 6,720,402B2, U.S. Pat. No. 7,935,131B2, U.S. Pat. No. 8,172,873B2 and U.S. Pat. No. 6,388,043B1.

In some scenarios, it is desirable to design a shape memory polymer with a transition temperature near body temperature (28° C. to 40° C.). For instance, a garment, in close contact with human body with a transition temperature near body temperature, can fit the body shape very well and do not lose retention power while wearing. Another example would be the use of a shape memory polymer as an implantation material in human body. In such cases, during the implantation process of an implantation material having a transition temperature near body temperature, no additional heating process is required, which is usually either complicated or dangerous since the heat may be detrimental to the human body.

Among different shape memory polymer candidates, polyurethane is one of the most versatile materials. Its chemical structure and physical properties are highly adjustable to meet various applications with easy processing method and low production cost. Shape memory polyurethane as a smart material is developed and researched since 1980s. For example, U.S. Pat. No. 6,583,194B2 and U.S. Pat. No. 5,049,591 disclosed shape memory polyurethane foams with glass transition temperature at or above room temperature. U.S. Pat. No. 5,155,199 disclosed shape memory polyurethane fine particles used in makeup materials. U.S. Pat. No. 5,098,776 disclosed a method to fabricate shape memory fibrous sheet. U.S. Pat. No. 5,145,935 disclosed shape memory polyurethane elastomer molded article. U.S. Pat. No. 5,135,786 disclosed shape memory polyurethane transparent body. U.S. Pat. No. 5,128,197 disclosed woven fabric made of shape memory polymer. U.S. Pat. No. 6,858,680B2 disclosed a shape memory polyurethane or polyurethane-urea polymers. Nonetheless, previous research focused in developing amorphous shape memory polyurethane with glass transition temperature as the transition temperature, in which the glass transition temperature is tunable to body temperature. However, semi-crystalline shape memory polyurethane with melting temperature around body temperature has never been disclosed. It has been suggested that the melting temperature of semi-crystalline shape memory polyurethane is about 10° C. lower than that of the polyester diol which is used as the starting material. In order to adjust the melting temperature of the semi-crystalline shape memory polyurethane to near body temperature, the melting temperature of the corresponding polyester diol should be around 30° C. to 50° C. However, the melting temperature of most polyester diols is around 50° C. to 60° C. while the molecular weight is above 2000 g/mol. Although the melting temperature of polyester diol can be decreased to below 50° C. by reducing its molecular weight to below 2000 g/mol, the resulting polyurethane does not exhibit shape memory effects. This may be due to the fact that the hard segment, especially the rigid moieties in the diisocyanate, impedes the crystallization of the soft segment of the polyurethane when low molecular weight polyester diol is used.

Although no prior patents reveal semi-crystalline shape memory polyurethane with transition temperature near body temperature, there are some journal publications describing such shape memory polymer. For example, in the paper [Macromolecules 2009, 42, 964-972], a crosslinking shape memory polyurethane using three-arm polycaprolactone triol as the soft segment is developed to possess melting temperature near body temperature. The three-arm polycaprolactone triol is synthesized using a special catalyst. The body temperature sensitive shape memory polyurethane developed has shown the huge potential in application. However, the complicated synthesis process and the cross-linking structure obstruct such smart material for the industrial mass production with acceptable manufacturing cost.

SUMMARY OF INVENTION

In the light of the foregoing background, it is an object of the present invention to fabricate semi-crystalline shape memory polyurethane with melting temperature near body temperature.

Accordingly, the present invention, in one aspect, is a semi-crystalline shape memory polymer, comprising a polymer chain, with melting temperature of 15° C. to 45° C. The polymer chain comprises a plurality of prepolymers and a plurality of chain extenders bonding the prepolymers together. Each prepolymer further comprises a plurality of synthesized units and each synthesized unit comprises at least one aliphatic segment and at least two urethane groups which are bonded to the carbon atoms at each end of the aliphatic segment.

In an embodiment of the present invention, the prepolymer further comprises a plurality of connecting units and each synthesized unit in the prepolymer is bonded between two connecting units.

In another embodiment, the precursor of the synthesized unit is a modified polymer diol unit represented by the following formula (I), in which n is an integer of 1 to 4; R is a molecular chain with molecular weight of 1,000 to 2,500 g/mol and melting temperature of 25° C. to 55° C.; and R' is the aliphatic segment of the synthesized unit.

According to another aspect of the present invention, a method producing shape memory polymer comprising the steps of reacting polymer diol with first diisocyanate to form a plurality of modified polymer diol units; reacting the modified polymer diol units with second diisocyanate to form a plurality of prepolymers; and polymerizing the prepolymers in the presence of chain extender is provided. The molar ratio of the polymer diol to the first diisocyanate is of the range of 1.3 to 3.

In another embodiment, the method comprises a further step of catalyzing the production of modified polymer diol units. The catalyst used can be selected from a group consisting of dibutyltin dilaurate, stannous octanoate and dibutyltin diacetate.

There are many advantages to the present invention. Semi-crystalline shape memory polymer, in most cases, has a narrower and sharper transition range comparing with amorphous shape memory polymer. Thus, the transition process of semi-crystalline shape memory polyurethane is more precise and sensitive to temperature change.

Another advantage of the present invention is that semi-crystalline shape memory polymer absorbs heat when the surrounding temperature is above its corresponding transition temperature, and releases heat when the surrounding temperature is below its corresponding transition temperature. This specific feature enables semi-crystalline polymer to be a temperature regulating material, in particular around the body temperature.

Furthermore, the crystallization temperature is usually lower than the melting temperature during the heating process of semi-crystalline polymer. As such, the semi-crystalline shape memory polymer can keep the elasticity in a relative large time scale when the surrounding temperature cools down to below the corresponding melting temperature slightly, whereas amorphous shape memory polyurethane cannot provide such hysteresis function when the surrounding temperature is below the corresponding transition temperature.

Lastly, the method of producing semi-crystalline shape memory polymer is relatively simple comparing to the existing manufacturing method which involves the usage of special catalysts. As such, the present invention provides a method which favors the industrial mass production with acceptable manufacturing cost.

DETAILED DESCRIPTION OF THE PREFERRED EMBODIMENTS

As used herein and in the claims, "comprising" means including the following elements but not excluding others.

A "polymer chain" comprises a number of atoms joined together by chemical bonds to form a polymer. An "aliphatic segment" is a segment of a polymer chain which comprises a number of atoms joined together by chemical bonds in the form of straight chains, branched chains, or non-aromatic rings.

A "urethane group" comprises a chemical structure as shown below:

A "diol" comprises a number of atoms joined together by chemical bonds containing exactly two hydroxyl groups and its general structure is represented as HO—R—OH.

A "diamine" comprises a number of atoms joined together by chemical bonds containing exactly two amino groups and its general structure is represented as $H_2N$—R—$NH_2$.

A "diisocyanate" comprises a number of atoms joined together by chemical bonds containing exactly two isocyanate groups and its general structure is represented as O=C=N—R—N=C=O. There are two types of diisocyanate: namely "aliphatic diisocyanate" and "aromatic diisocyanate". Aliphatic diisocyanate is a diisocyanate with R being a straight chain, branched chain, or non-aromatic ring; whereas aromatic diisocyanate is a diisocyanate with R containing benzene rings.

In one aspect of the present invention, a semi-crystalline shape memory polymer with a melting temperature near body temperature (15° C. to 45° C.) is disclosed. The shape memory polymer can fix and stay in a temporary deformed shape stably when the temperature is below the body temperature; and return to its original shape when the temperature rises higher than the body temperature.

In one embodiment, the polymer chain comprises a plurality of prepolymers and a plurality of chain extender joining the prepolymers together. Within each prepolymer, there exists a plurality of synthesized units and a plurality of connecting units for joining the synthesized units together.

In one embodiment, the precursor of the synthesized unit in the prepolymer is a modified diol unit represented by the following formula (I):

where R is the molecular chain of a polymer diol with molecular weight of 1,000 to 2,500 g/mol and melting temperature of 25° C. to 55° C.; R' is an aliphatic segment originated from an aliphatic diisocyanate; and n is an integer of 1 to 4.

In another aspect of the present invention, methods of producing the above mentioned modified diol unit and the shape memory polymer thereof are provided. The modified diol unit is obtained by reacting polymer diol with diisocyanate at a molar ratio satisfying the following formula (II):

$$1.3 \le \frac{b}{a} \le 3 \qquad \text{(II)}$$

wherein b is the number of moles of polymer diol and a is the number of moles of diisocyanate. If the molar ratio is less than 1.3, the constituted shape memory polymer may have a melting temperature exceeding the range of 15° C. to 45° C. and thus temperature higher than body temperature is required to trigger the recovery of the shape memory polymer from the temporarily deformed shape back to the original shape. On the other hand, if the molar ratio is larger than 3, the constituted shape memory polymer may have a melting temperature below the range of 15° C. to 45° C., and the temporarily deformed temporary shape cannot be fixed and maintained while the surrounding temperature is at room temperature, for instance at 25° C.

Suitable polymer diol that can react with diisocyanate to form the modified diol unit includes but not limited to polycaprolactone diol (PCL), polycarbonate diol (PCDL), polytetramethylene ether glycol (PTMEG), polyethylene glycol (PEG), and any polyester diol prepared by the polycondensation reaction between one or more dicarboxylic acid components, such as adipic acid, sebacic acid, with one or more polyalcohol components, such as ethylene glycol, diethylene glycol, 1,4-butylene glycol, 1,3-butylene glycol, 1,6-hexamethylene glycol.

The theoretical average molecular weight of the modified diol unit can be calculated by the following formula (III):

$$M_{n,t} = \frac{b \times M_{n,b} + a \times M_{n,a}}{b - a} \qquad \text{(III)}$$

wherein $M_{n,t}$ is the theoretical average molecular weight of the modified diol unit; $M_{n,b}$ is the molecular weight of polymer diols and $M_{n,a}$ is the molecular weight of diisocyanate. The actual average molecular weight of the modified diol unit can be determined by the hydroxyl value which can be measured using stand method such as ISO 14900:2011 with the following formula (IV):

$$M_n = \frac{56,100}{OHV} \times 2 \qquad \text{(IV)}$$

Wherein $M_n$ is the actual average molecular weight of the synthesized modified diol unit, OHV is the hydroxyl value of the synthesized modified diol unit (unit: mgKOH/g) determined by the standard method.

In one specific embodiment, the diisocyanate used in the above mentioned synthesizing step of the modified diol unit should have a flexible molecular chain. Diisocyanate with flexible molecular chain has a less barrier effect to the crystallization of the soft segment in the synthesized polymer compared with diisocyanate with rigid moieties. As a result, a lower melting temperature can be reserved in the constituted polymer made thereof.

The diisocyanate having flexible molecular chain includes but not limited to 1,6-hexamethylene diisocyanate (HDI), isophorone diisocyanate (IPDI), 4,4'-methylene bis(cyclohexyl diisocyanate) (H-MDI), 1,4-cyclohexane diisocyanate (CHDI), bis(methyldiisocyanate)cyclohexane (HXDI), trimethylhexamethylene diisocyanate (mixture of 2,2,4- and 2,4,4-isomer) (TMHDI) and norbornene diisocyanate (NBDI). In a more preferred embodiment, the diisocyanate is HDI or THMDI.

In another embodiment, catalyst can be used to accelerate the above mentioned synthesizing step. In a preferred embodiment, the catalyst is organometallic compounds, especially those containing tin element, such as dibutyltin dilaurate, stannous octanoate, dibutyltin diacetate. The amount of the catalyst used ranges from 10 to 500 ppm; in one preferred embodiment, the amount ranges from 20 to 200 ppm based on the total weight of the reactants that are used for producing the modified diol unit.

In an embodiment, the synthesizing step is conducted at the temperature of 85° C. to 95° C. for two to three hours until all the isocyanate groups of the diisocyanate vanish. This can be confirmed by Fourier transform infrared spectroscopy (FTIR) in which no peak at around 2,270 cm$^{-1}$ is observed.

After obtaining the modified diol units, the shape memory polymer is then obtained by reacting the modified polymer diol unit with second diisocyanate to form a plurality of prepolymers, and then polymerizing the prepolymers in the presence of the chain extender.

In one embodiment, the above mentioned second diisocyanate is an aliphatic diisocyanate, which includes but not limited to 1,6-hexamethylene diisocyanate (HDI), isophorone diisocyanate (IPDI), 4,4'-methylene bis(cyclohexyl diisocyanate) (H-MDI), 1,4-cyclohexane diisocyanate (CHDI), bis(methyldiisocyanate) cyclohexane (HXDI), trimethylhexamethylene diisocyanate (mixture of 2,2,4- and 2,4,4-isomers) (TMHDI) and norbornene diisocyanate (NBDI).

In another embodiment, the above mentioned second diisocyanate is an aromatic diisocyanate, which includes but not limited to 4,4'-diphenylmethane diisocyanate (MDI), toluene diisocyanate (TDI), 1,5-naphthylene diisocyanate (NDI), p-phenylene diisocyanate (PPDI) and xylene diisocyanate (XDI).

In one embodiment, the above mentioned chain extender is a diol chain extender, which includes but not limited to ethylene glycol, 1,4-butanediol, 1,6-hexanediol, 1,4-bis(2-hydroxyethoxy)benzene and 1,3-bis(2-hydroxyethoxy)benzene.

In another embodiment, the above mentioned chain extender is a diamine chain extender, which includes but not limited to ethylenediamine, 1,2-propanediamine, methylene diphenylamine, isophorone diamine, hydrazine, phenylenediamine, tolylenediamine and xylylenediamine.

It should be noticed that when a diol chain extender is used, the constituted shape memory polymer will be pure polyurethane whereas when a diamine chain extender is used, the constituted shape memory polymer will be polyurethaneurea.

The approach in which the polymerization step is carried out depends on the type of chain extender used. When a diol chain extender is used, the constituted semi-crystalline shape memory polymer will be thermoplastic polyurethane and the synthesize process is preferably performed by bulk polymerization. The bulk polymerization can be conducted using the method of producing ordinary thermoplastic polyurethane, for instance, by a twin screw extruder with the lift-to-drag ratio (L/D ratio) between 30 to 60 and the reaction temperature between 160° C. to 260° C. The bulk polymerization can utilize the one-shot method to produce the semi-crystalline polyurethane, i.e. the modified diol units, diol chain extender and the diisocyanate used in the polymerization step are charged into the twin screw extruder at the same time. The NCO index which is defined as the mole ratio of diisocyanate to all diols, including modified diol units and diol chain extender, is in the range from 0.98 to 1.10; in a preferred embodiment, the NCO index ranges from 1.00 to 1.05. The hard segment content, which is defined as the weight fraction of the diol chain extender and diisocyanate used in the polymerization step to all other components, is between 20% and 50%; in a preferred embodiment, the hard segment content ranges between 25% and 35%. The average molecular weight of the constituted semi-crystalline shape memory polymer ranges from 80,000 to 200,000 g/mol and the polydispersity index ranges from 1.5 to 4.5. The average molecular weight and the polydispersity index can be determined by Gel Permeation Chromatography (GPC) measurement using polystyrene as standard and dimethylformamide (DMF) as mobile phase.

The constituted semi-crystalline shape memory polymer made from diol chain extender can further be spun to a fiber by melting spinning method. The melt spinning machine used is preferably equipped with a single screw extruder having four heating zones, a metering gear pump and a spinneret. The temperature setting of the third and fourth zone of the single screw extruder, gear pump and the spinneret is 190° C. to 210° C. The winding speed is 400 to 700 m/min. The resulting shape memory fibers, which contain mono or multiple filaments, have a linear density of 20~1,200 D. The fibers also have a tenacity of 0.6 to 1.4 cN/D and elongation at break of 400% to 800%

In the case of using diamine chain extender in the polymerization step, the resulting constituted semi-crystalline shape memory polymer is thermoset polyurethaneurea, and the synthesize process is preferably performed in solution. Suitable solvent used should be able to dissolve polyurethaneurea, which includes but not limited to dimethylformamide (DMF), dimethylacetamide (DMAc), and dimethyl sulfoxide (DMSO). The solid concentration of the solution is 20% to 50%; in a preferred embodiment, the solid concentration is 30% to 40%. The polymerization in solution preferably utilizes a two-stage method known as prepolymer method. First, the modified diol units are reacted with the diisocyanate to form an isocyanate capped prepolymer at the temperature of 85° C. to 90° C. for two to three hours. The mole ratio of diisocyanate to modified diol units is between 2.0 to 2.1. Then the isocyanate capped prepolymer is cooled down and dissolved thoroughly in solvent. The solid concentration of the prepolymer solution is 40% to 50%. While the prepolymer solution is still being mixed, diamine chain extender dissolved in solvent having solid concentration of 2% to 5% is added slowly. The NCO index in such solution polymerization step is 0.98 to 1.10; in a preferred embodiment, the NCO index is 1.00 to 1.05. In order to control the viscosity of the solution monoamine, the targeted viscosity of the final polyurethaneurea solution ranges from 200 to 500 Pa·s and the solid content ranges from 30% to 40%. The average molecular weight of the semi-crystalline shape memory polymer is around 20,000 to 80,000 g/mol and the polydispersity index is 2.5 to 6.5. The average molecular weight and the polydispersity index are also determined by GPC measurement using polystyrene as standard and DMF as mobile phase.

Similarly, the constituted semi-crystalline shape memory polymer made from diamine chain extender can further be spun to a fiber. Nonetheless the process is conducted using wet spinning or dry spinning method instead of the melt spinning method. The winding speed is 500 to 800 m/min. The resulting shape memory fibers, which contain mono or multiple filaments, have a linear density of 20 to 1,200 D, a tenacity of 0.6 to 1.4 cN/D and elongation at break of 400% to 800%.

To quantitatively assess the properties of the constituted semi-crystalline shape memory polymer, the enthalpy ($\Delta H$) and the melting temperature thereof are measured. Specifically, the measuring process comprises the following steps:

1. heating up the sample from −40° C. to 220° C. at a heating rate of 10° C./min;
2. cooling the sample from 220° C. to −40° C. at a heating rate of 10° C./min; and
3. heating up the sample from −40° C. to 220° C. at a heating rate of 10° C./min;

wherein step 3 is defined as the second heating process.

Apart from the enthalpy and the melting temperature, the fixing and recovery ability of the constituted semi-crystalline shape memory polymer are also quantitatively measured. The resulting fiber is first cut to 10 cm and fixed onto two edges of a frame. One edge of the frame can be moved and locked. Two marks are made on the middle part of the fiber to indicate a 5 cm length ($L_0$). Then the free edge of the frame is stretched to make the 5 cm length of the fiber to elongate into a 10 cm length (100% elongation). Then the edge of the frame is locked and put into a refrigerator (at around 5° C.) for 15 minutes. Then the frame is taken out and the fiber is taken off from the frame and placed in room temperature environment (at around 25° C.) for another 15 minutes. The length between the two marks of the fiber is measured as $L_1$. The fiber is then heated to 32° C. in oven for 10 minutes and upon heating, the length between the two marks of the fiber is measured as $L_2$. Shape fixity ratio ($R_f$) at 25° C. and shape recovery ratio ($R_r$) at 32° C. are calculated using the following formulas (V) and (VI):

$$R_f = \frac{L_1 - L_0}{L_o} \times 100\% \quad (V)$$

$$R_r = \left(1 - \frac{L_2 - L_0}{L_o}\right) \times 100\% \quad (VI)$$

To illustrate the above mentioned shape memory polymer and the fabrication method thereof, five different examples are studied and results thereof are provided herein, which are not intended to limit the present invention. In examples 1 and 2, the molar ratio of polymer diol to diisocyanate (b/a) is within the range of 1.3 to 3; whereas in comparative examples 3 and 4, which are used to illustrate that it is essential for the b/a ratio to be in the range of 1.3 to 3 to achieve the unique characteristics of the shape memory polymer of this invention, the value of b/a is bigger than 3 and less than 1.3 respectively. Comparative example 5 is used to illustrate that it is essential for the melting point range of the diol used to synthesize the modified diol unit to be within the range of 30° C. to 50° C.; preferably within the range of 40° C. to 50° C.

Example 1

Fabrication of Modified Diol Unit 180 g (0.09 mole) polycaprolactone diol (hereinafter PCL2000, molecular weight 2,000 g/mol, melting point 40° C. to 50° C., obtained from Perstop U.K. Ltd.) was added into a 1,000 ml three neck flask. The flask was outfitted with a thermometer, mechanical agitator, vacuum ports and nitrogen ports. The temperature was raised to 90° C. by hot oil bath and the material was dehydrated by vacuum for 2 hours while being stirred. Upon completion of vacuuming, the flask was allowed to repressurize to 1 atmosphere. Then 7.56 g (0.045 mole) HDI was added. The reaction was kept at 90° C. for 2 hours using dibutyltin dilaurate as catalyst. Two hours later, no peak at 2,270 cm$^{-1}$ was observed in FTIR measurement which confirmed that all the HDI had been coupled with PCL2000. The mole ratio of PCL2000 to HDI, i.e. b/a, is 2.0. The theoretical average molecular weight of the modified polyester diol unit was 4,168 g/mol. The measured hydroxyl number was 27.2 mgKOH/g.

Fabrication of the Semi-Crystalline Shape Memory Polymer 22.5 g (0.09 mole) MDI was added into the above modified diol unit and the reaction was kept at 85° C. for 2 hours under nitrogen atmosphere to form the isocyanate capped prepolymer. Next, the prepolymer was cooled to room temperature by water bath and 245 g DMAc was added to dissolve the prepolymer. Then 2.7 g (0.045 mole) ethylenediamine dissolved in 130 g DMAc was slowly added into the prepolymer solution under stirring. When the viscosity increased to about 300 Pa·s, the adding of ethylenediamine solution was stopped and diethyleneamine was added to terminate the reaction.

Figure 1:
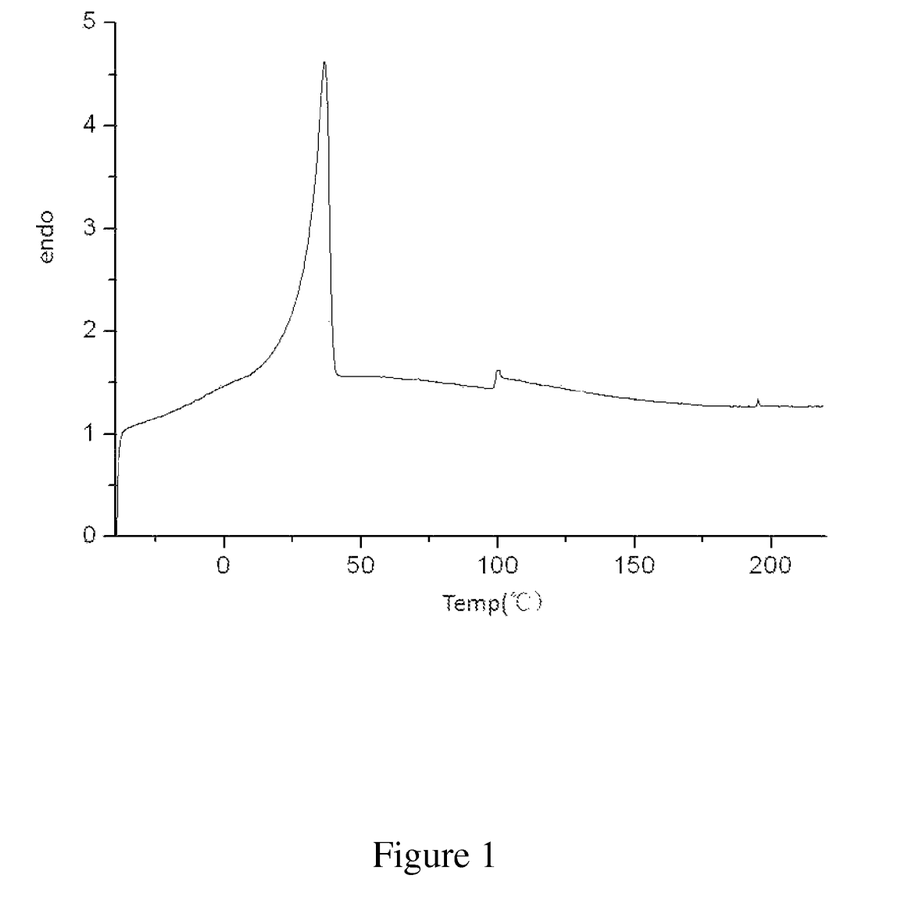
FIG. 1 shows the result of the second heating process applied to analyze the shape memory polymer obtained in example 1.

The resulting solution was taken to the dry spinning to produce 70 D fiber containing 4 filaments. The fiber had a tenacity of 0.9 cN/D and elongation at break of 510%. Around 5 to 10 mg of fiber was taken to the differential scanning calorimetry (DSC) measurement. The second heating process was shown in FIG. 1. The melting temperature range was from 29° C. to 39.6° C. with the peak point at 36.7° C. and the enthalpy was 22.6 J/g. The fiber had a shape fixity ratio of 80% at 25° C. and shape recovery ratio of 90% at 32° C.

Example 2

Fabrication of Modified Diol Unit 180 g (0.09 mole) PCL2000 was added into a 1,000 ml three neck flask. The flask was outfitted with a thermometer, mechanical agitator, vacuum ports and nitrogen ports. The temperature was raised to 90° C. by hot oil bath and the material was dehydrated by vacuum for 2 hours while being stirred. Upon completion of vacuuming, the flask was allowed to repressurize to 1 atmosphere. Then 10.08 g (0.06 mole) HDI was added and the reaction was kept at 90° C. for 2 hours using dibutyltin dilaurate as catalyst. Two hours later, no peak at 2,270 cm$^{-1}$ was observed in FTIR measurement, confirming that all the HDI had been coupled with PCL2000. The mole ratio of PCL2000 to HDI, i.e. b/a, is 1.5. The theoretical average molecular weight of the modified polyester diol unit was 6,336 g/mol. The measured hydroxyl number was 18 mgKOH/g.

Fabrication of the Semi-Crystalline Shape Memory Polymer 15 g (0.06 mole) MDI was added into the above modified diol unit and the reaction was kept at 85° C. for 2 hours under nitrogen atmosphere to form the isocyanate capped prepolymer. Next, the prepolymer was cooled to room temperature by water bath and 290 g DMAc was added to dissolve the prepolymer. Then 1.8 g (0.03 mole) ethylenediamine dissolved in 90 g DMAc as chain extender was slowly added into the prepolymer solution under stirring. When the viscosity increased to about 300 Pa·s, the adding of ethylenediamine solution was stopped and diethyleneamine was added to terminate the reaction.

Figure 2:
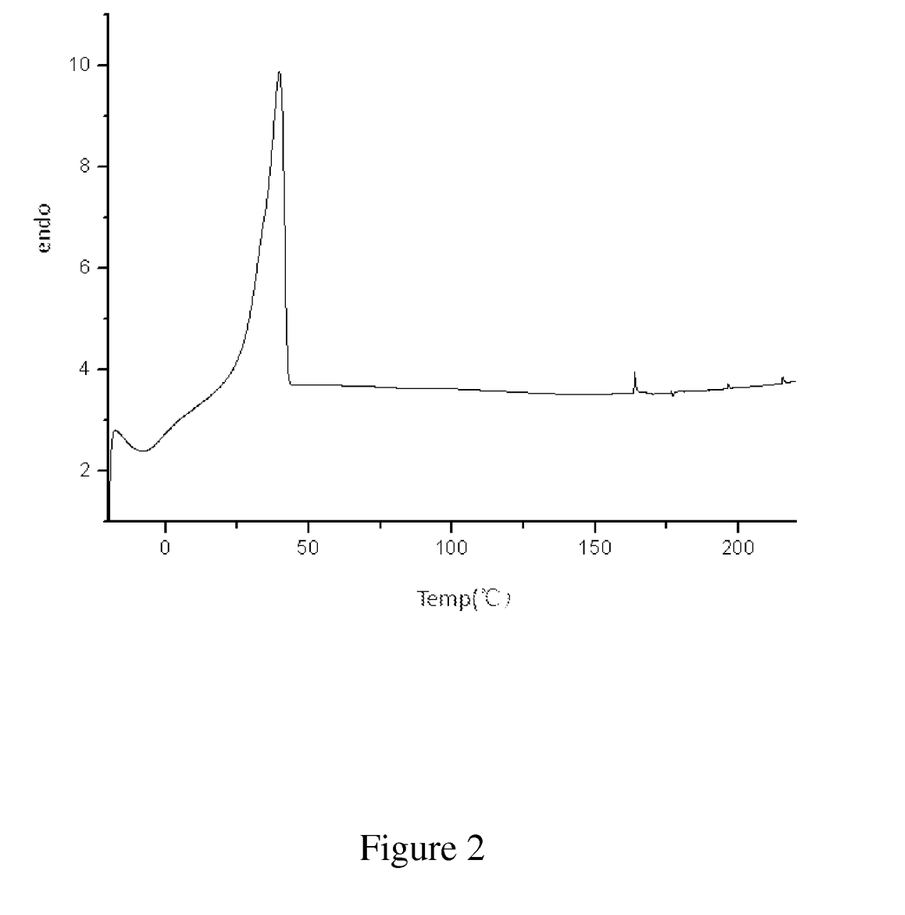
FIG. 2 shows the result of the second heating process applied to analyze the shape memory polymer obtained in example 2.

The resulting solution was taken to the dry spinning to produce 70 D fiber containing 4 filaments. The fiber had a tenacity of 0.8 cN/D and elongation at break of 620%. Around 5 to 10 mg of fiber was taken to the DSC measurement. The second heating process was shown in FIG. 2. The melting temperature range was from 30.7° C. to 42.5° C. with the peak point at 39.82° C. and the enthalpy was 33.9 J/g. The fiber had a shape fixity ratio of 90% at 25° C. and shape recovery ratio of 80% at 32° C.

Comparative Example 3

Fabrication of Modified Diol Unit 180 g (0.09 mole) PCL2000 was added into a 1,000 ml three neck flask. The flask was outfitted with a thermometer, mechanical agitator, vacuum ports and nitrogen ports. The temperature was raised to 90° C. by hot oil bath and the material was dehydrated by vacuum for 2 hours while being stirred. Upon completion of the vacuuming, the flask was allowed to repressurize to 1 atmosphere. Then 3.78 g (0.0225 mole) HDI was added. The reaction was kept at 90° C. for 2 hours using dibutyltin dilaurate as catalyst. Two hours later, no peak at 2,270 cm$^{-1}$ was observed in FTIR measurement confirming that all the HDI had been coupled with PCL2000. The mole ratio of PCL2000 to HDI, i.e. b/a, is 4. The theoretical average molecular weight of the modified polyester diol unit was 2,722 g/mol and the measured hydroxyl number was 42 mgKOH/g.

Fabrication of the Semi-Crystalline Shape Memory Polymer 33.75 g (0.135 mole) MDI was added into the above modified diol unit and the reaction was kept at 85° C. for 2 hours under nitrogen atmosphere to form the isocyanate capped prepolymer. Next, the prepolymer was cooled to room temperature by water bath and 220 g DMAc was added to dissolve the prepolymer. Then 4.05 g (0.0675 mole) ethylenediamine dissolved in 200 g DMAc as chain extender was slowly added into the prepolymer solution under stirring. When the viscosity increased to about 300 Pa·s, the adding of ethylenediamine solution was stopped and diethyleneamine was added to terminate the reaction.

Figure 3:
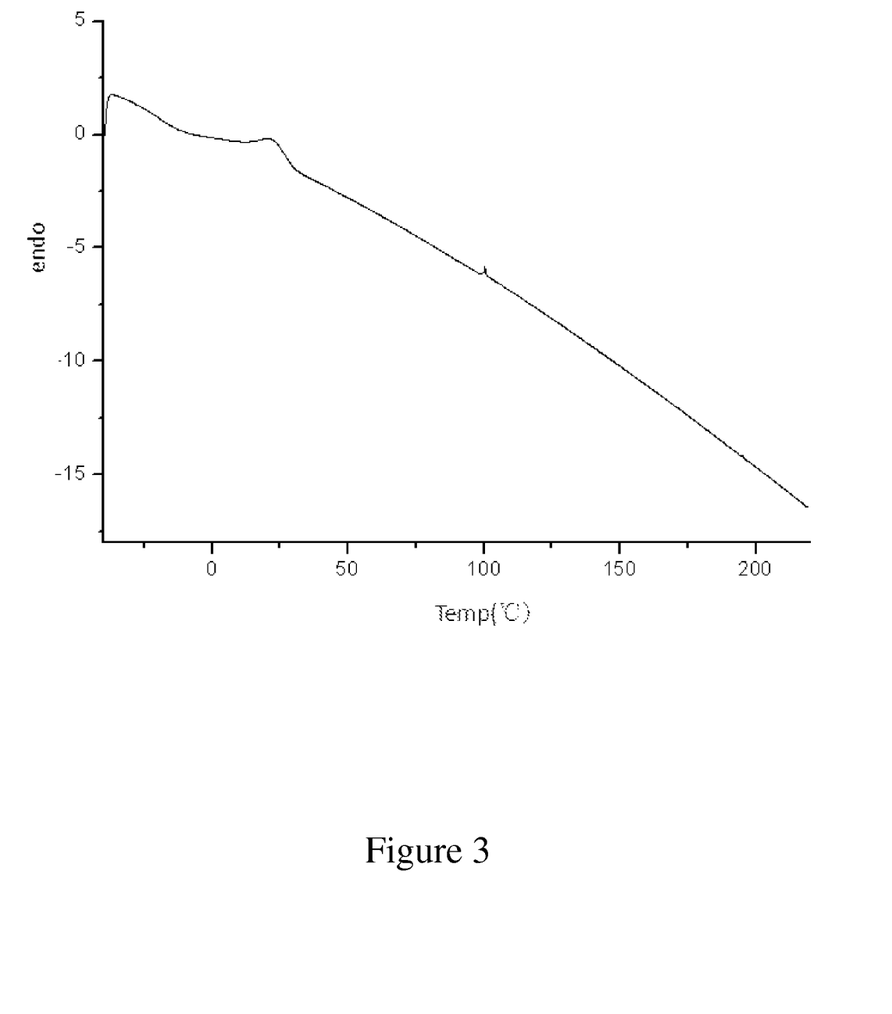
FIG. 3 shows the result of the second heating process applied to analyze the shape memory polymer obtained in comparative example 3.

The resulting solution was taken to the dry spinning to produce 70 D fiber containing 4 filaments. The fiber had a tenacity of 1.2 cN/D and elongation at break of 400%. Around 5 to 10 mg of fiber was taken to the DSC measurement. The second heating process was shown in FIG. 3. The melting temperature range was from 10.75° C. to 30.12° C. with the peak point at 22.3° C. and the enthalpy was 8.8 J/g. The fiber had a shape fixity ratio of 35% at 25° C. and shape recovery ratio of 95% at 32° C.

Comparative Example 4

Fabrication of Modified Diol Unit 180 g (0.09 mole) PCL2000 was added into a 1,000 ml three neck flask. The flask was outfitted with a thermometer, mechanical agitator, vacuum ports and nitrogen ports. The temperature was raised to 90° C. by hot oil bath and the material was dehydrated by vacuum for 2 hours while being stirred. Upon completion of the vacuuming, the flask was allowed to repressurize to 1 atmosphere. Then 12.5 g (0.0744 mole) HDI was added. The reaction was kept at 90° C. for 2 hours using dibutyltin dilaurate as catalyst. Two hours later, no peak at 2,270 cm$^{-1}$ was observed in FTIR measurement confirming that all the HDI had been coupled with PCL2000. The mole ratio of PCL2000 to HDI, i.e. b/a, is 1.21. The theoretical average molecular weight of the modified polyester diol unit was 12,323 g/mol. The measured hydroxyl number was 10 mgKOH/g.

Fabrication of the Semi-Crystalline Shape Memory Polymer 7.81 g (0.031 mole) MDI was added into the above modified diol unit and the reaction was kept at 85° C. for 2 hours under nitrogen atmosphere to form the isocyanate capped prepolymer. Next, the prepolymer was cooled to room temperature by water bath and 326 g DMAc was added to dissolve the prepolymer. Then 0.937 g (0.0156 mole) ethylenediamine dissolved in 50 g DMAc as chain extender was slowly added into the prepolymer solution under stirring. When the viscosity increased to about 300 Pa·s, the adding of ethylenediamine solution was stopped and diethyleneamine was added to terminate the reaction.

Figure 4:
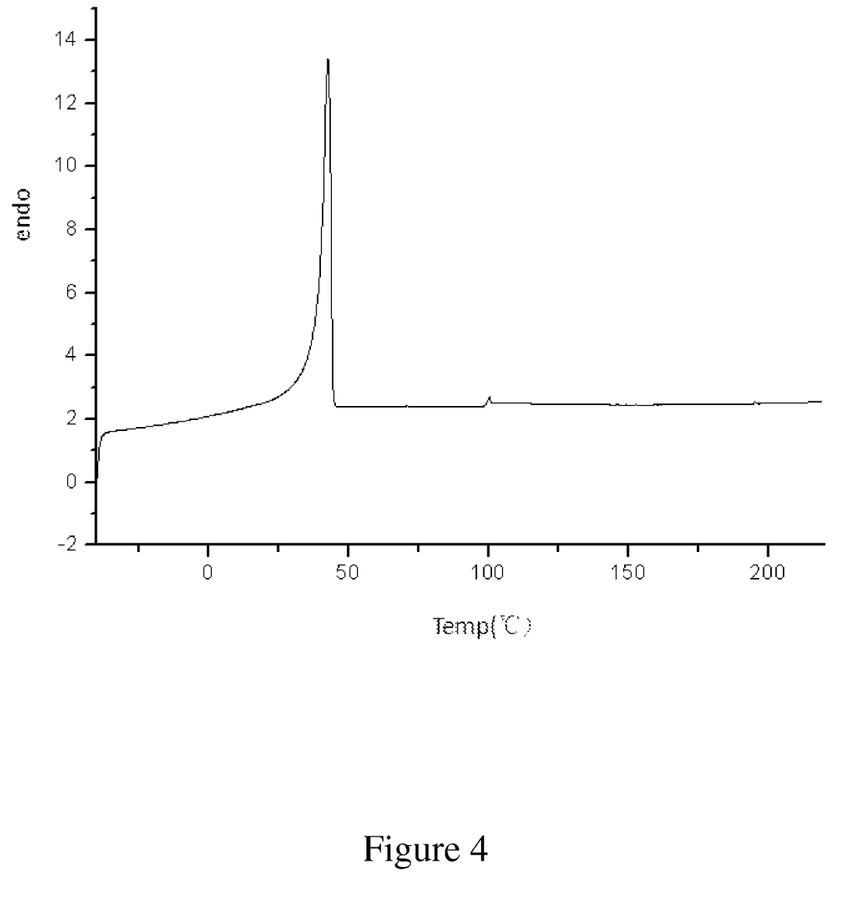
FIG. 4 shows the result of is the second heating process applied to analyze the shape memory polymer obtained in comparative example 4.

The resulting solution was taken to the dry spinning to produce 70 D fiber containing 4 filaments. The fiber had a tenacity of 0.61 cN/D and elongation at break of 760%. Around 5 to 10 mg of fiber was taken to the DSC measurement. The second heating process was shown in FIG. 4. The melting temperature range was from 39° C. to 44.4° C. with the peak point at 42.7° C. and the enthalpy was 36.4 J/g. The fiber had a shape fixity ratio of 98% at 25° C. and shape recovery ratio of 40% at 32° C.

Comparative Example 5

Fabrication of Modified Diol Unit 180 g (0.062 mole) polytetramethylene ether (hereinafter PTMEG2900, molecular weight 2,900 g/mol, melting point 20° C. to 30° C., obtained from Invista Ltd.) was added into a 1,000 ml three neck flask. The flask was outfitted with a thermometer, mechanical agitator, vacuum ports and nitrogen ports. The temperature was raised to 90° C. by hot oil bath and the material was dehydrated by vacuum for 2 hours while being stirred. Upon completion of the vacuuming, the flask was allowed to repressurize to 1 atmosphere. Then 5.21 g (0.031 mole) HDI was added. The reaction was kept at 90° C. for 2 hours using dibutyltin dilaurate as catalyst. Two hours later, no peak at 2,270 cm$^{-1}$ was observed in FTIR measurement confirming that all the HDI has been coupled with PTMEG2900. The mole ratio of PTMEG2900 to HDI, i.e. b/a, is 2. The theoretical average molecular weight of the modified polyester diol unit was 5968 g/mol. The measured hydroxyl number was 19 mgKOH/g.

Fabrication of the Semi-Crystalline Shape Memory Polymer 15.52 g (0.062 mole) MDI was added into the above modified diol unit and the reaction was kept at 85° C. for 2 hours under nitrogen atmosphere to form the isocyanate capped prepolymer. Next, the prepolymer was cooled to room temperature by water bath and 276 g DMAc was added to dissolve the prepolymer. Then 1.86 g (0.031 mole) ethylenediamine dissolved in 100 g DMAc as chain extender was slowly added into the prepolymer solution under stirring. When the viscosity increased to about 300 Pa·s, the adding of ethylenediamine solution was stopped and diethyleneamine was added to terminate the reaction.

Figure 5:
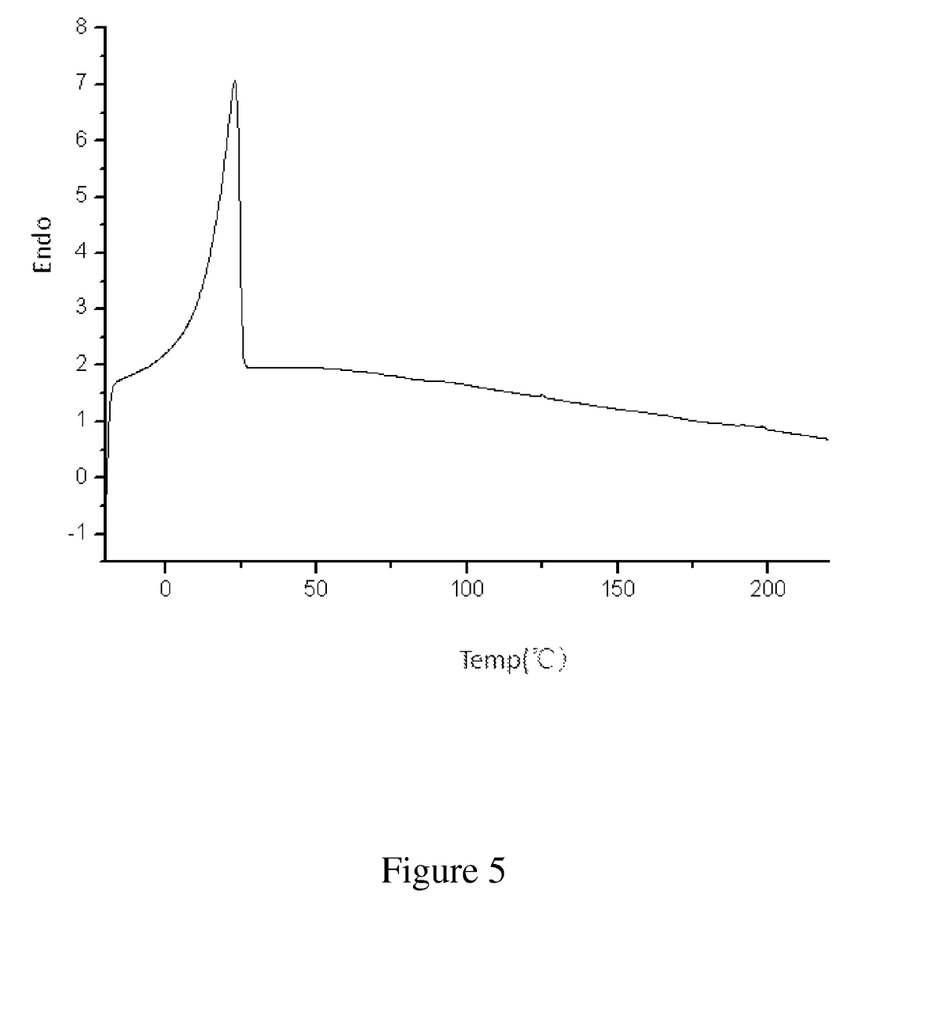
FIG. 5 shows the result of the second heating process applied to analyze the shape memory polymer obtained in comparative example 5.

The resulting solution was taken to the dry spinning to produce 70 D fiber containing 4 filaments. The fiber had a tenacity of 0.6 cN/D and elongation at break of 780%. Around 5 to 10 mg of fiber was taken to the DSC measurement. The second heating process was shown in FIG. 5. The melting temperature range was from 13° C. to 25° C. with the peak point at 22.3° C. and the enthalpy was 34.6 J/g. The fiber had a shape fixity ratio of 40% at 25° C. and shape recovery ratio of 95% at 32° C.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A method of producing a shape memory polymer, comprising the steps of:
   reacting a polymer diol with an aliphatic diisocyanate to form a modified polymer diol unit such that a molar ratio of said polymer diol to said aliphatic diisocyanate is in a range of 1.3:1 to 3:1;
   reacting said modified polymer diol unit with an aromatic diisocyanate to form a prepolymer; and
   polymerizing said prepolymer in a presence of a chain extender to produce said shape memory polymer.

2. The method according to claim 1, further including a step of:
   catalyzing the reaction between said polymer diol and said aliphatic diisocyanate by adding an organometallic compound selected from a group consisting of dibutyltin dilaurate, stannous octanoate and dibutyltin diacetate.

3. The method according to claim 1, wherein said modified polymer diol unit is represented by the following formula (I):

$$HO-R \left[ -O-\overset{O}{\underset{}{C}}-\overset{}{\underset{H}{N}}-R'-\overset{}{\underset{H}{N}}-\overset{O}{\underset{}{C}}-O-R \right]_n -OH \quad (I)$$

wherein n is an integer of 1 to 4; R is a molecular chain of said polymer diol and R' is an aliphatic segment of said aliphatic diisocyanate.

4. The method according to claim 3, wherein said polymer diol is a polycaprolactone diol or a polyester diol prepared by the polycondensation reaction between at least one dicarboxylic acid component and at least one polyalcohol component.

5. The method according to claim 4, wherein said dicarboxylic acid component is selected from a group consisting of adipic acid and sebacic acid; and said polyalcohol component is selected from a group consisting of 1,4-butylene glycol and 1,6-hexamethylene glycol.

6. The method according to claim 3, wherein said polymer diol has a molecular weight of 1,000 to 2,500 g/mol and a melting temperature ranging from 25° C. to 55° C.

7. The method according to claim 1, wherein said aliphatic diisocyanate is selected from a group consisting of 1,6-hexamethylene diisocyanate, isophorone diisocyanate, 4,4'-methylene bis(cyclohexyl diisocyanate), 1,4-cyclohexane diisocyanate, bis(methyldiisocyanate) cyclohexane, trimethylhexamethylene diisocyanate (mixture of 2,2,4- and 2,4,4,-isomer) and norbornene diisocyanate.

8. The method according to claim 1, wherein said aromatic diisocyanate is selected from a group consisting of 4,4'-diphenylmethane diisocyanate, toluene diisocyanate, 1,5-naphthylene diisocyanate, p-phenylene diisocyanate and xylene diisocyanate.

9. The method according to claim 1, wherein said chain extender has a molecular weight less than 400 g/mol and is a diamine chain extender.

10. The method according to claim 9, wherein said diamine chain extender is selected from a group consisting of ethylenediamine, 1,2-propanediamine, methylene diphenylamine, isophorone diamine, hydrazine, phenylenediamine, tolylenediamine, xylylenediamine.

11. A semi-crystalline shape memory polymer, comprising:
a polymer chain having a chain extender and a prepolymer with a synthesized unit that includes a polymer diol and an aliphatic diisocyanate to form a modified polymer diol unit, wherein the shape memory polymer has a melting temperature ranging from 15° C. to 45° C., and wherein a molar ratio of said polymer diol to said aliphatic diisocyanate is in a range of 1.3:1 to 3:1,
wherein said prepolymer further includes a connecting unit; said synthesized unit is bonded between two said connecting units; and said modified polymer diol unit is represented by the following formula (I):

wherein n is an integer of 1 to 4; R is a molecular chain of said polymer diol having molecular weight of 1,000 to 2,500 g/mol and melting temperature of 25° C. to 55° C.; and R' is an aliphatic segment of said aliphatic diisocyanate,
wherein said connecting unit is an aromatic diisocyanate.

12. The shape memory polymer according to claim 11, wherein said aromatic diisocyanate is selected from a group consisting of 4,4'-diphenylmethane diisocyanate, toluene diisocyanate, 1,5-naphthylene diisocyanate, p-phenylene diisocyanate and xylene diisocyanate.

13. The shape memory polymer according to claim 11, wherein said chain extender has a molecular weight less than 400 g/mol and said chain extender is a diamine chain extender.

14. The shape memory polymer according to claim 13, wherein said diamine chain extender is selected from a group consisting of ethylenediamine, 1,2-propanediamine, methylene diphenylamine, isophorone diamine, hydrazine, phenylenediamine, tolylenediamine, xylylenediamine.

15. The shape memory polymer according to claim 11, wherein said aliphatic diisocyanate is selected from a group consisting of 1,6-hexamethylene diisocyanate, isophorone diisocyanate, 4,4'-methylene bis(cyclohexyl diisocyanate), 1,4-cyclohexane diisocyanate, bis(methyldiisocyanate)cyclohexane, trimethylhexamethylene diisocyanate (mixture of 2,2,4- and 2,4,4,-isomer) and norbornene diisocyanate.

16. The shape memory polymer according to claim 11, wherein said polymer diol is a polycaprolactone diol or a polyester diol prepared by the polycondensation reaction between at least one dicarboxylic acid component and at least one polyalcohol component.

17. The shape memory polymer according to claim 16, wherein said dicarboxylic acid component is selected from a group consisting of adipic acid and sebacic acid; and said polyalcohol component is selected from a group consisting of 1,4-butylene glycol and 1,6-hexamethylene glycol.

* * * * *